Jan. 17, 1961   P. G. NORBÄCK   2,968,165
AIR CONDITIONING METHOD AND APPARATUS
Filed Dec. 22, 1955   3 Sheets-Sheet 1

INVENTOR

PER GUNNAR NORBÄCK

BY Eric K. Wunsch

ATTORNEY

Jan. 17, 1961 P. G. NORBÄCK 2,968,165
AIR CONDITIONING METHOD AND APPARATUS
Filed Dec. 22, 1955 3 Sheets-Sheet 2

INVENTOR
PER GUNNAR NORBÄCK
BY Eric Y. Munky
ATTORNEY

United States Patent Office 2,968,165
Patented Jan. 17, 1961

2,968,165

AIR CONDITIONING METHOD AND APPARATUS

Per Gunnar Norbäck, 1C Bergsliden, Lidingo, Sweden

Filed Dec. 22, 1955, Ser. No. 554,793

4 Claims. (Cl. 62—94)

The present invention relates to improvements in air conditioning systems and more particularly to a method and apparatus of treating air of a room or other enclosure, especially in warm climates, so as to reduce its moisture content and preferably also its temperature. It is known in prior art to effect such air conditioning by means of a refrigerating machine lowering the temperature of the air and removing from said air part of its content of water vapor. Upon reduction of the water vapor content to a desired predetermined value the air usually must be heated in order to attain a desired predetermined comfort condition. Said heating is effected either by means of the heat dissipated from the condenser of the refrigerating machine or produced by a separate heating element.

It is also known to condition the air inside a room or other enclosure by initially drying the air through absorption of moisture within a regenerative absorption system and subsequently cooling said air. Said cooling is effected by heat exchange produced in a heat transferrer in which the cooling medium used is water pre-cooled by means of outdoor air in a cooling tower or similar device. Within said heat transferrer the two heat exchanging media are passed through passages separated from one another. If the cooling water, as often happens, has not the required low temperature, water is caused to evaporate into the air of the room or enclosure after that said air has left the heat transferrer. Said measure results in an additional reduction of the temperature of said air, whereupon said air is allowed to return into the room or enclosure. This air conditioning process implies that the absorption system has to remove considerably more of the water vapor content of the air of the room or enclosure than corresponds to the final condition of the air when re-introduced into the room or enclosure.

It is also known in prior art to combine a refrigerating machine and a drying device of the regenerative absorber type.

One main object of the invention is to provide a method and apparatus rendering possible air conditioning with considerably lower consumption of power, in particular with regard to the amount of energy required for the cooling of the air.

Another object of the invention is to effect the air conditioning by means of a refrigerating machine of minor size than required hitherto.

Further objects and advantages of the invention will become apparent from the following description considered in connection with the accompanying drawings which form part of the specification and of which:

The method of the present invention in its broader aspects comprises the steps of passing a stream of air to be conditioned in series through a regenerative type of moisture transferrer having an element for absorbing moisture from the air stream and a cooling element for cooling the dehumidified air. The moisture absorbing element is regenerated by heating and the capacity of the element to absorb moisture is varied in response to a condition of the stream of air leaving the element to produce the substantially constant predetermined moisture content therein. In other words, the moisture content of the air is decreased to its final condition which will produce a comfort condition after it has been cooled. Also, the cooling element is maintained at a temperature above the dew point temperature of the dehumidified air in said stream. Thus, the stream of air is dehumidified to a desired condition without cooling and is subsequently cooled without dehumidification.

The method of the present invention also contemplates the additional steps of precooling the air prior to dehumidification and/or after cooling the dehumidified air in separate stages. The stream of dehumidified air may be cooled in the first stage by flowing outside air in heat exchange therewith and cooled in the second stage by a cooling medium flowing through the cooling element. The temperature of the outside air may be reduced by the evaporation of water therein to increase the cooling in the first stage. Also, the moisture absorbing element may be regenerated by flowing a stream of heated outside air in contact therewith and then flowing said heated air in heat exchange with the entering stream to preheat said air.

Figure 1:
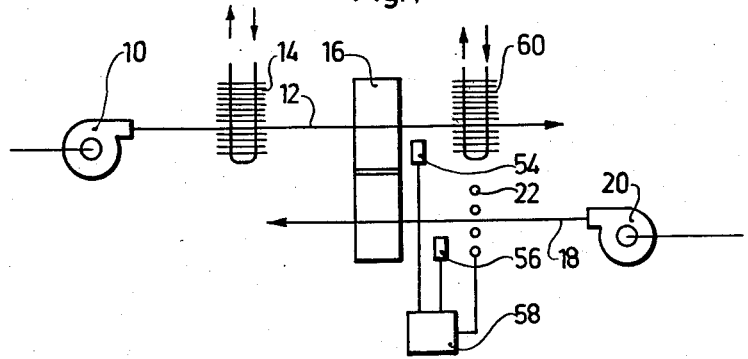
Figs. 1 and 2 are schematic views of two embodiments of apparatus for carrying out the steps of the method according to the invention.

Referring to the embodiment of apparatus illustrated in Fig. 1 for carrying out the method, 10 designates a fan conveying air from the room or enclosure to be conditioned through a conduit 12 from which the air returns into said room or enclosure. During its way through the apparatus said room air or "leaving air" first meets a cooling element 14 forming part of a refrigerating machine which may be of known construction and for this reason is not shown as complete unit. The air then passes through a moisture transferrer 16 of the regenerative type and thereupon through a further cooling unit 60. Outdoor air is impelled through a conduit 18 separate from the conduit 12 of the apparatus by means of a fan 20. Said air is in sequence brought into contact with a heater 22 and the moisture transferrer 16 prior to its discharge into the ambient atmosphere. A condition responsive bulb 54 is mounted in conduit 12 downstream of the moisture transferrer 16 and a condition responsive bulb 56 is mounted in the conduit 18 downstream of the heater 22 and said bulbs are coordinated so as to form a differential or double hygrostat system 58. Said hygrostat system is provided with a relay controlling the supply of heat to the heater so as to ensure that the outdoor air during its passage through the moisture transferrer 16 always will have a lower relative humidity than the room air streaming through the same zone of said transferrer.

The purpose of the moisture transferrer 16 is to transfer moisture from the one air stream to the other. In order to absorb as much moisture as possible it should transfer at most only a negligible quantity of heat from one medium to the other. Moisture transferrers of this kind may comprise a rotating wheel containing a non-heat-conductive hygroscopic material having passages through which air may flow as described in my co-pending U.S. application, Serial No. 485,632, now Patent No. 2,925,880, filed February 2, 1955 which satisfy high demands in this respect. For further particulars of the construction and operation of said moisture transferrers reference is made to said disclosure. The moisture transferrers may also be of the type shown in my co-pending U.S. applications, Serial Nos. 442,686 and 442,687, both filed July 12, 1954, both now abandoned. All of these transferrers are of the regenerative type comprising a transferrer element or elements moving in a closed circuit along which its individual parts are moved cyclically across or between the two conduits or flow passages into which the moisture transferrer is inserted. Such moisture transferrers comprise a transferring mass which may be composed of thin wires or still better layers of sheets or foil-like partitions. For example, the material may be in the form of a packing of corrugated sheets of paper impregnated with hygroscopic salts such as lithium or calcium chloride or a combination of such salts. The transferrers preferably are of the continuously operating type although intermittently or alternately operating moisture transferrers also may be used, which may have a transferring body comprising two absorptive elements of which one is in operation to remove moisture while the other is being regenerated. When moisture transferrers are mentioned hereinafter they are to be of the types set forth hereinbefore.

Figure 3:
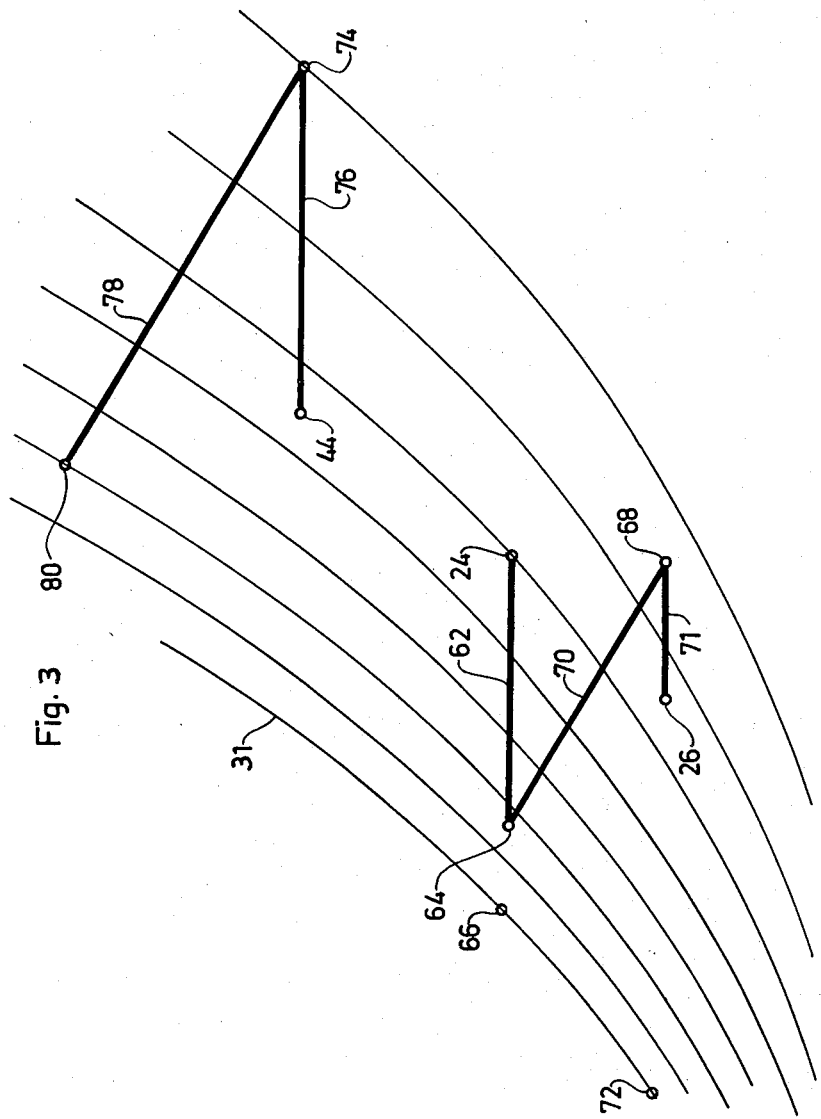
Figs. 3 and 4 are charts showing the psychrometric interactions resulting from the method as practiced in the two embodiments of apparatus illustrated in Figs. 1 and 2, respectively.

Referring to the psychometric chart shown in Fig. 3 relating to the specific embodiment represented in Fig. 1, the ordinate gives the absolute moisture content of the air in grams of water per kilogram of dry air. The abscissa gives the dry bulb temperature in ° F., and the curves give the relative humidity of the air in percent.

When various points of the charts are referred to by reference numerals in the following description the conditions prevailing at the point in consideration will be indicated by inserting within parenthesis the thermodynamic characteristics of the air stream at said point.

The air exhausted from the room or enclosure will be assumed for the purpose of this example to have the psychrometric condition represented by point 24 (80°, 50%) of the chart. The final psychrometric condition of the room air when re-introduced into the room is represented by point 26 (72°, 45%). These figures represent substantially the optimum values under the indicated climatic conditions, but should not, of course, be taken as restrictive in any manner upon the application of the invention. The figures are given in round numbers for the sake of simplicity.

Room air having the condition 24 is passed through the cooling unit 14, which cooling step is reflected on the chart by line 62 running parallelly to the abscissa to point 64 (65°, 85%). The cooling surfaces of the cooling unit 14 must have a temperature not lower than corresponding to point 66, namely 60°. Said point is located in the saturation curve 31, i.e. the curve for a relative humidity of 100% in the prolongation of the line 62. In order completely to avoid condensation the temperature of the cooling surfaces must be kept above said value. In other words, the cooling operation is effected without any or with an insignificant reduction only of the absolute humidity of the room air. The moisture transferrer 16 then dries the air to the condition represented by point 68 (80°, 35%). The line 70 connecting the points 64 and 68 is represented on the chart as an enthalpy line. The second cooling unit 60 then cools the air along line 71 to the predetermined final condition 26 (72°, 45%). The cooling is effected without any simultaneous drying operation.

In the embodiment described the refrigeration load required is represented by the distance between the enthalpy lines passing through the points 24 and 26, respectively. Due to the relatively high temperature of the cooling surfaces the compressor of the refrigerating machine operates with high efficiency. It is suitable to use the same compressor for both cooling units. If the cooling unit 60 is fed by a separate compressor, the temperature of the surfaces thereof should be higher than corresponding to the psychrometric condition represented by point 72 (48°, 100%) in order to avoid condensation, but may advantageously be higher than that of the surfaces of the cooling unit 14.

The outdoor air impelled through the conduit 18 is heated by the heater 22 from an assumed primary condition represented by point 44 (88°, 55%) on the chart to a condition represented by point 74 (108°, 30%) along line 76 extending in parallel to the abscissa. The point 74 indicates a lower relative humidity than does the point 68. Inside the moisture transferrer 16 the outdoor air is subjected to a change of condition represented by the enthalpy line 78 and vented into the atmosphere while in the condition represented by point 80 (84°, 80%). The amount of heat required for conditioning 1 kilogram of room air may be read from the chart by multiplying the distance between the enthalpy lines passing through the points 44 and 74, respectively, with the ratio of the difference between the length of the lines 70 and 78, respectively. The quantity of outdoor air required is about 60% of the quantity of room air passed through the installation.

Figure 2:
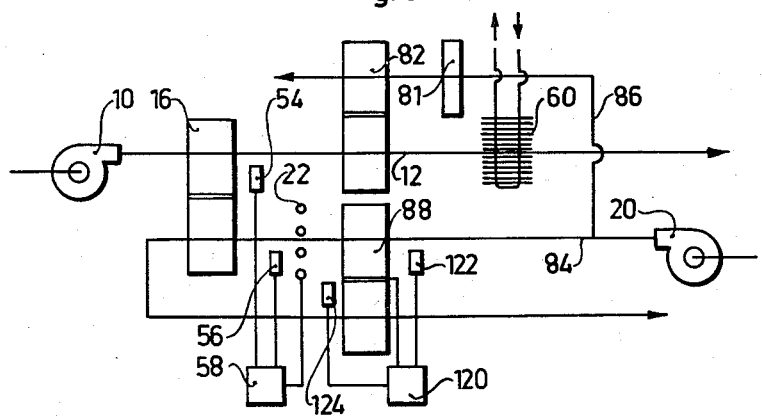

Referring to the embodiment illustrated in Fig. 2 the room air exhausted from the room or enclosure and streaming through the conduit 12 passes in sequence through a moisture transferrer 16, a heat transferrer 82 and a cooling unit 60 and is then returned into the room or enclosure. In this embodiment the installation includes two passages 84, 86 for the outdoor air which may be impelled into both passages by a common fan 20. Within the passage 84 the outdoor air meets in sequence a heat exchanger 88, the heater 22, the moisture transferrer 16 and finally again the heat exchanger 88 in which exchanger said air stream thus exchanges heat with itself. In the same manner as in the preceding embodiment the outdoor air is vented into the atmosphere. Inside the passage 86 the outdoor air initially traverses an evaporation pad 81 and thereupon the heat transferrer 82. The evaporative pad 81 is devised so as to allow water supplied from an outer source to evaporate into the outdoor air when in the installation.

Figure 4:
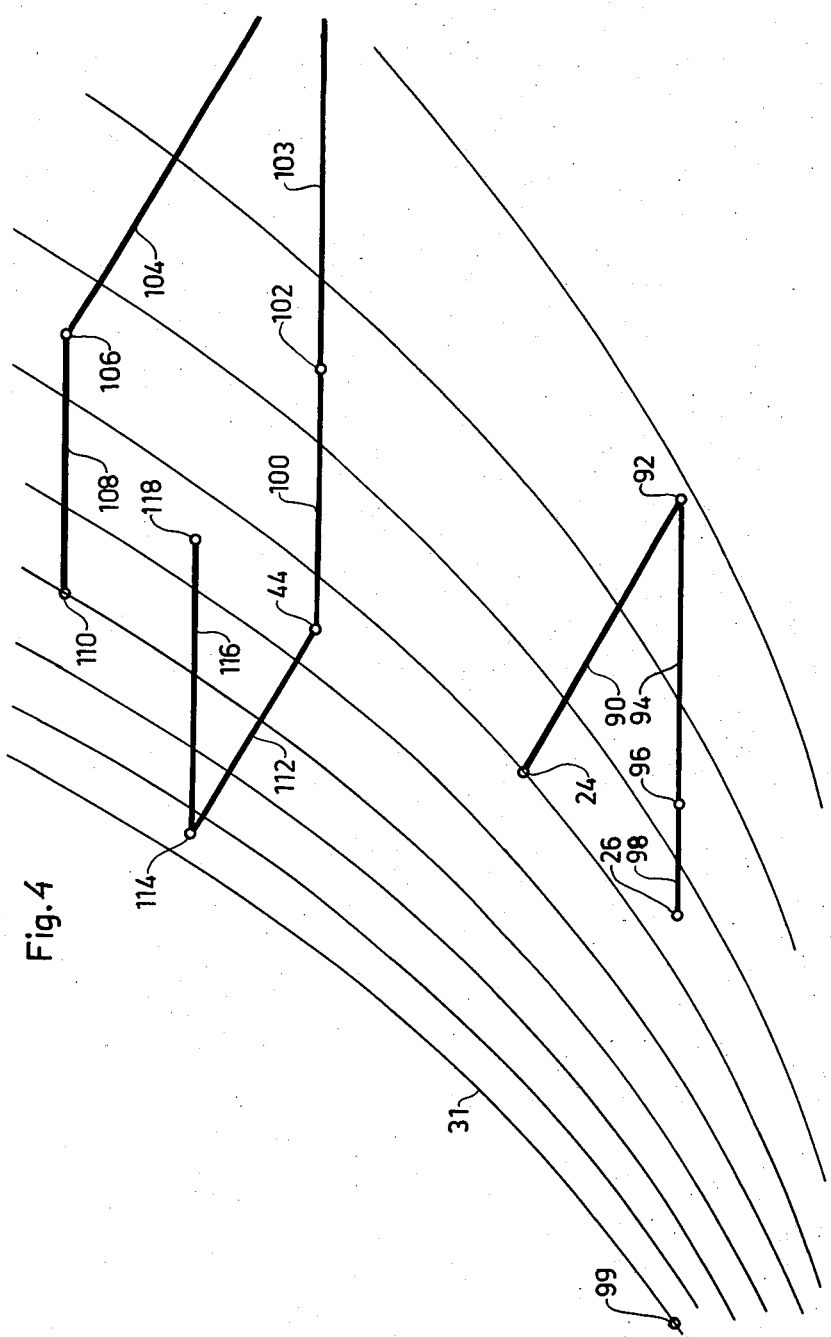

The mode of operation of the installation illustrated in Fig. 2 will be understood from the psychrometric chart shown as Fig. 4. The room air which as in the embodiment described hereinbefore is assumed to have the primary condition represented by the point 24 (80°, 50%) is passed through the moisture exchanger 16 reducing the absolute moisture content thereof following a line on the chart represented by the enthalpy line 90 to point 92 (95°, 22%). As will be readily understood from the chart, the moisture content indicated by the point 92 is the same as will exist in the desired final psychrometric condition represented by the point 26 (72°, 45%). In the heat exchanger 82 the room air is cooled along line 94 to point 96 (79°, 36%). The final cooling of the room air along line 98 to the final comfort condition represented by the point 26 is effected by the cooling unit 60. The surfaces of said cooling unit should have a temperature higher than that represented by point 99 located on an extension of the saturation curve 31 and of the line 98 in order to avoid precipitation of condensate on said surfaces.

The branch of the atmospheric air streaming through the passage 84 is heated from the condition represented by the point 44 (88°, 55%) along line 100 to the condition represented by point 102 (102°, 36%). Said heating is effected by the heat transferrer 88 in a manner to be explained below in more detail. The heater 22 produces an additional heating of the air to a condition of 122° F. and a relative humidity of 17% not represented by any point on the chart, which humidity thus is below the figure represented by the point 92. The air heated by the heater 22 passes through the moisture transferrer 16, the room air being dried along the line 90 simultaneously with the increase of the humidity of the outdoor air along a line shown on the chart as an enthalpy line 104 to the psychrometric condition of said outdoor air represented by point 106 (106°, 45%). The enthalpy of the outdoor air is used in the heat transferrer 88 for a primary heating of the outdoor air according to the line 100. The escaping outdoor air is hereby cooled along line 108 to its final psychrometric condition represented by point 110 (90°, 70%).

The second branch of the outdoor air traversing the passage 86 is subjected in the evaporative pad 81 to a temperature reduction under simultaneous increase of its absolute and relative humidity. Referring to the chart, said change of condition is effected along the enthalpy line 112 to the condition represented by point 114 (75°, 95%). Said outdoor air has now sufficiently low temperature to be adapted to cool the room air in the heat transferrer 82 along the line 94, said outdoor air being heated in said heat transferrer along line 116 to the final condition represented by point 118 (93°, 55%).

In the embodiment just described the refrigerating capacity required is represented by the distance between the enthalpy lines passing through the points 96 and 26, respectively. It will be readily understood that said capacity will be small and amount to only 15-20% of the capacity required in the installations known in the prior art indicated hereinbefore. The quantity of outdoor air passed through the passage 84 and having for its purpose to dry the room air when traversing the moisture transferrer 16 is about 60 to 65%, and the quantity of outdoor air required for the cooling in the heat transferrer 82 is about 100%, of the quantity of room air treated in the path 12 of the installation.

The embodiment shown in Fig. 2 includes besides the differential hygrostat device 54, 56 and 58 a differential thermostat 120 comprising a bulb 122 located, for example, between the fan 20 and the heat exchanger 88 and a second bulb 124 located downstream of the moisture transferrer 16 and upstream of said heat exchanger 88. Said differential thermostat is adapted to shut off the heat exchanger 88 when the temperature of the outdoor atmospheric air is higher than the temperature of the air stream downstream of the moisture transferrer 16.

The heat transferrers 82 and 88 included in the installation are primarily intended to be of the kind which substantially transfers sensible heat only and thus substantially no or only a reduced amount of moisture between the air streams traversing the passages. The heat transferrer may advantageously be of the type disclosed in my co-pending U.S. applications Serial No. 387,656, filed October 22, 1953 and No. 442,686, filed July 12, 1954, and may be of the regenerative type comprising a heat conductive transfer body moving in a closed circuit across the passages through which the air flows. Said transfer body may be composed of thin wires or sheets or foils, having a high coefficient of heat transfer.

The psychrometric charts in Figs. 3 and 4 illustrate the most favourable efficiency of the moisture transferrers and the heat transferrers. As will be evident from the disclosures cited above, said efficiency may be very high and amount to 90%, for example, and even more. For the sake of simplicity, said charts assume a 100% moisture and heat transfer effectiveness of the respective transferrers, i.e., only heat being transferred by the heat transferrer and only moisture by the moisture transferrer. If the transferrers should not be 100% effective, the points shown in the chart will be somewhat displaced. Thus if the moisture transfer along the line 90 in Fig. 4 should be combined with some heat transfer between the air streams, then the point 92 would be displaced towards the right and the line 94 extended accordingly. In actual practice transfer and change of condition strictly along the enthalpy lines cannot be attained partly for the reason that the absorption heat is added to the vapor condensation heat and partly because of the inherent heat capacity of the transferrer mass. For the same reason the line 112 in Fig. 4 will deviate or lean somewhat from the enthalpy line on the chart on account of the heat retaining capacity of the evaporated water. If on the other hand the cooling along the line 94 should be combined with a transfer of moisture, for example due to a leakage in the heat transferrer, said feature should be considered in the operation of the apparatus by permitting the moisture transferrer to dry the air during a longer period than is indicated by the point 92 in the extension of the line 90. The absolute water vapor content of the air will thereby be reduced below the desired final psychrometric condition represented by the point 26 in order to ensure that said condition will be attained. However, in accordance with the gist of the invention there will never during the entire treatment of the air occur any reduction of the absolute vapor content of said air to such low values as are encountered in the apparatus and systems recognized in this description as known in prior art and which necessitate moistening of the air as a last step of processing.

It is possible to partly or totally replace the heat from the heater 22 by heat from the condenser of the refrigerating machine. Cold produced in an artificial way is understood to mean cold not available from a natural source but produced by a refrigerating system known per se in prior art, in the first instance a refrigerating machine of the compressor type. The denomination "sorption" is understood to comprise both absorption and adsorption.

While two more or less specific embodiments of the invention have been described, it is to be understood that this is for purpose of illustration only and that the invention is not to be limited thereby, but its scope to be determined by the appended claims.

What I claim is:

1. A method of conditioning air for an enclosure with the aid of a moisture transferrer having a moisture sorption element and of a sensible cooling element, which comprises the steps of passing a stream of air to be conditioned in contact with the sorption element and the cooling element in series, varying the capacity of said sorption element to remove moisture from the stream of air in response to a condition of the air in said stream to produce a predetermined moisture content required for comfort conditions, maintaining said moisture content substantially unchanged until it enters the enclosure by maintaining the sensible cooling element at a temperature above the dew point temperature of the air in said stream whereby moisture will be removed from said stream in said sorption element without being cooled and said stream will be cooled by said cooling element without moisture removal as it passes in contact therewith, the stream of air leaving the sorption element being cooled in successive stages, which cooling is carried out with a temperature on the cooling element of a degree to avoid condensation thereon, the air stream in the first of said stages being cooled to a lower temperature than when cooled in the second stage.

2. A method of conditioning air for an enclosure with the aid of a moisture transferrer having a moisture sorption element and of a sensible cooling element which comprises the steps of passing a stream of air to be conditioned in a first path through the sorption element and the cooling element in series, varying the capacity of said sorption element to remove moisture from the stream of air in response to a condition of the air in said stream to produce a predetermined moisture content required for comfort conditions, maintaining said moisture content substantially unchanged until it enters the enclosure by maintaining the sensible cooling element at a temperature above the dew point temperature of the air in said stream whereby moisture will be removed from said stream in said sorption element without being cooled and said stream will be cooled by said cooling element without moisture removal as it passes in contact therewith, passing a stream of heated air in a second path through said sorption element to remove moisture therefrom, and passing a stream of outside air through a third path in heat exchange with the stream of dehumidified air in said first path after it leaves the sorption element.

3. The method of conditioning air for an enclosure in accordance with claim 2 which comprises the step of passing outside air through the second path, heating said air before it contacts with the sorption element, and passing said outside air leaving the sorption element in heat exchange with the portion of outside air passing to the sorption element in said second path to preheat the outside air before the final heating step.

4. The method of conditioning air for an enclosure in accordance with claim 2 which comprises the step of cooling the outside air in said third path by evaporative cooling before passing it in heat exchange with the air in said first path.

References Cited in the file of this patent

UNITED STATES PATENTS

| | | |
|---|---|---|
| 1,872,783 | Miller | Aug. 23, 1932 |
| 1,945,441 | Miller | Jan. 30, 1934 |
| 1,970,301 | Frankel | Aug. 14, 1934 |
| 2,019,291 | Brace | Oct. 29, 1935 |
| 2,053,159 | Miller | Sept. 1, 1936 |
| 2,085,964 | Fonda | July 6, 1937 |
| 2,089,776 | Wittmann | Aug. 10, 1937 |
| 2,136,513 | Lednum | Nov. 15, 1938 |
| 2,156,293 | Kaufman | May 2, 1939 |
| 2,180,467 | Heisterkamp | Nov. 21, 1939 |
| 2,186,844 | Smith | Jan. 9, 1940 |
| 2,197,203 | Buffington | Apr. 16, 1940 |
| 2,200,243 | Newton et al. | May 14, 1940 |
| 2,257,478 | Newton | Sept. 30, 1941 |
| 2,257,485 | Sewell | Sept. 30, 1941 |
| 2,723,837 | Pennington | Nov. 15, 1955 |